(12) United States Patent
Chennakeshu et al.

(10) Patent No.: US 10,228,488 B2
(45) Date of Patent: Mar. 12, 2019

(54) DETERMINING A LOAD STATUS OF A PLATFORM

(71) Applicant: BlackBerry Limited, Waterloo (CA)

(72) Inventors: Sandeep Chennakeshu, Austin, TX (US); Yu Gao, Waterloo (CA); Victor James Stolpman, Spring, TX (US); Jesse William Bennett, Apex, NC (US)

(73) Assignee: BlackBerry Limited, Waterloo, Ontario (CA)

( * ) Notice: Subject to any disclaimer, the term of this patent is extended or adjusted under 35 U.S.C. 154(b) by 193 days.

(21) Appl. No.: 15/229,495

(22) Filed: Aug. 5, 2016

(65) Prior Publication Data

US 2018/0038991 A1 Feb. 8, 2018

(51) Int. Cl.
| | |
|---|---|
| *G06F 17/18* | (2006.01) |
| *G01V 8/10* | (2006.01) |
| *G01V 8/12* | (2006.01) |
| *G01S 17/08* | (2006.01) |
| *G06Q 10/08* | (2012.01) |
| *G01S 17/02* | (2006.01) |
| *G01S 17/88* | (2006.01) |
| *G01S 7/48* | (2006.01) |
| *G01S 7/497* | (2006.01) |

(52) U.S. Cl.
CPC ............ *G01V 8/12* (2013.01); *G01S 7/4808* (2013.01); *G01S 7/497* (2013.01); *G01S 17/026* (2013.01); *G01S 17/08* (2013.01); *G01S 17/88* (2013.01); *G06Q 10/087* (2013.01)

(58) Field of Classification Search
CPC G01V 8/12; G01S 17/08; G01S 7/497; G01S 7/4808; G01S 17/88; G01S 17/026; G06Q 10/087

USPC .................................................... 250/222.1
See application file for complete search history.

(56) References Cited

U.S. PATENT DOCUMENTS

| | | | | |
|---|---|---|---|---|
| 5,347,274 A | * | 9/1994 | Hassett | ................. G01S 13/765 340/988 |
| 5,712,789 A | * | 1/1998 | Radican | ................. G06Q 10/08 700/226 |
| 6,148,291 A | * | 11/2000 | Radican | ................. G06Q 10/08 705/22 |
| 2009/0325658 A1 | | 12/2009 | Phelan et al. | |
| 2012/0314059 A1 | | 12/2012 | Hoffmann et al. | |
| 2013/0269832 A1 | | 10/2013 | Gengerke | |
| 2016/0076225 A1 | | 3/2016 | Atkinson et al. | |

(Continued)

FOREIGN PATENT DOCUMENTS

WO 2016001481 A1 1/2016

OTHER PUBLICATIONS

European Patent Office, International Search Report and Written Opinion for PCT/US2017/045102 dated Nov. 10, 2017 (13 pages).

(Continued)

*Primary Examiner* — Seung C Sohn
(74) *Attorney, Agent, or Firm* — Trop, Pruner & Hu, P.C.

(57) ABSTRACT

Based on a relationship between measurement data from at least one sensor and a baseline, a load status of a platform is determined. In response to the determined load status, such as determining that the platform is empty, the baseline is refined using a baseline estimator to produce a refined baseline that can be used to determine a further load status of the platform.

20 Claims, 4 Drawing Sheets

(56) References Cited

U.S. PATENT DOCUMENTS

2018/0170720 A1\* 6/2018 Mannari ................ B66C 13/48

OTHER PUBLICATIONS

Faragher, Ramsey, Lecture Notes, Understanding the Basis of the Kalman Filter Via a Simple and Intuitive Derivation, Aug. 20, 2012 (5 pages).
Wikipedia, Kalman filter dated on or before Mar. 30, 2016 (42 pages).

\* cited by examiner

DETERMINING A LOAD STATUS OF A PLATFORM

BACKGROUND

Trucks, tractor-trailers, or tractors that are connected to chassis for carrying containers can be used to transport cargo that includes goods. Trucks, tractor-trailers, and containers typically have doors that can be opened to allow access to cargo that is being transported, and closed to secure the cargo.

BRIEF DESCRIPTION OF THE DRAWINGS

Some implementations of the present disclosure are described with respect to the following figures.

DETAILED DESCRIPTION

Figure 1A:
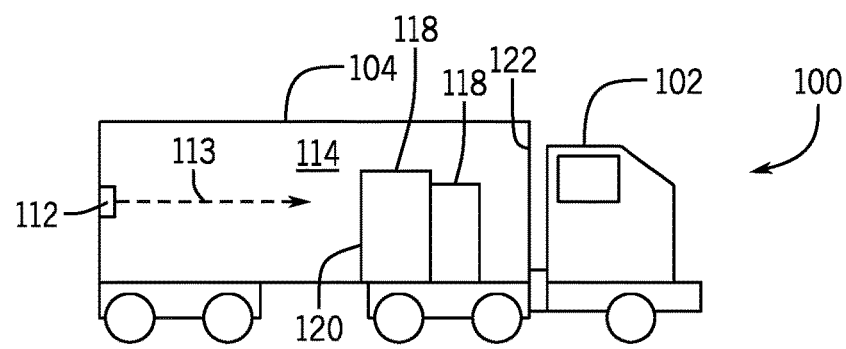
FIGS. 1A-1B are schematic diagrams of a container hauled by a vehicle, the container including a door and a sensor device according to some implementations.

A moveable platform can be used to carry physical items between different geographic locations. For example, the moveable platform can be a container (that is attached to a tractor), a truck, or a trailer in which the physical items can be stored during shipment. In other examples, the moveable platform can include another type of carrier structure that is able to carry physical items. More generally, the moveable platform can be part of, mounted on, or attached, as applicable, to a vehicle, such as a truck, a trailer, a tractor, a car, a train, a ship, an airplane, and so forth. In the ensuing discussion, a moveable platform can be referred to as a container. It is noted that techniques or mechanisms according to some implementations can be applied to other cargo carrying platforms with an entry barrier that can be opened and closed.

A moveable platform can include a door through which physical items can be loaded or unloaded into or from an inner chamber of the moveable platform, respectively. The door is an example of an entry barrier (or more simply, a "barrier") that can be opened and closed. Other examples of barriers include a window or any other structure that can be opened to allow entry through an opening, or closed to block entry through the opening An entity such as a shipper, a distributor, a manufacturer, a seller of goods, or any other entity may wish to track assets (such as cargo) that are being transported using moveable platforms. To do so, a sensor device can be mounted on a moveable platform. Sensor devices on various moveable platforms can communicate sensor information over a network to a remote service to allow the remote service to track assets that are being moved by various moveable platforms. The remote service can include a server or a collection of servers and associated network equipment that may be located at one fixed location or in a mobile unit or as part of a data center or cloud. The asset tracking can include tracking the current locations of the assets, cargo load status of moveable platforms, conditions of the environment around the assets (where such conditions can include a measured temperature, a measured humidity, etc.), and/or other information.

A sensor device can include a communication component to communicate over a network. In some examples, sensor devices mounted on moveable platforms can be part of a larger network of devices. This larger network of devices can be part of the "Internet-of-Things" (IoT) technology paradigm to allow different types of devices to communicate different types of data (including sensor data, voice data, video data, e-mail data, picture or image data, messaging data, web browsing data, and so forth). In addition to network traffic communicated by computers, smartphones, wearable devices, and the like, the IoT technology paradigm contemplates that other types of devices, including household appliances, vehicles, sensor devices, thermostats, and so forth have connectivity to a network to allow the devices to communicate respective data.

More generally, asset tracking using network connected sensor devices can involve acquiring sensor data, transmitting the sensor data, and aggregating such sensor data or producing other measures based on the sensor data to determine information associated with the assets that are being transported by moveable platforms. Based on data received from the sensor devices, a server (or servers) can update a database, run analytics, and/or present status information for display, such that further decisions or actions can be performed. The asset tracking can be used to improve fleet utilization, reduce operating cost, reduce loss of assets due to theft, and so forth.

In some examples, a measure that can be derived based on measurements made by a sensor device mounted on a moveable platform is a load status of the moveable platform, where the load status can refer to whether or not the moveable platform contains any physical items such as cargo (i.e., the container is empty or the container contains at least one physical item). Accurately detecting the load status of a container can be challenging due to one or more factors. For example, the characteristics of a moveable platform may change over time, such as due to addition of structures within the chamber of the moveable platform, presence of debris in the moveable platform chamber, cleaning of the inner chamber of the moveable platform, repainting of the inner walls of the moveable platform, and so forth. In addition, the hardware of the sensor device can also vary over time, such as due to varying temperature or due to aging of the hardware, which can affect the sensitivity, gain, and/or other characteristic of a sensor in the sensor device. Moreover, different moveable platforms and different sensor devices may have different characteristics due to variances in manufacturing and/or configuration. Furthermore, the size and construction composition of the moveable platform can vary from one moveable platform to another. Also, the surrounding environment for different sensor devices may be different. Due to such varying characteristics of the moveable platform and/or the sensor device, a determination of a load status based on measurement data from the sensor device may not be accurate.

In accordance with some implementations of the present disclosure, an adaptive baseline estimator can adapt (refine) a baseline that is used for determining whether or not a moveable platform is empty or loaded with at least one physical item. Generally, a "baseline" can refer to a condition that indicates a specific load status of the moveable platform. The condition that indicates a specific load status of the moveable platform can be represented as a metric (or metrics) having a specified value or range of specified values. In some examples, a baseline can refer to a condition that indicates that the moveable platform is empty. Such a baseline can be referred to as an "empty baseline." In the ensuing discussion, it is assumed that the baseline that is used for determining a load status of a moveable platform is an empty baseline. It is noted that in other implementations, the baseline can refer to a condition that indicates that a moveable platform is loaded with at least one physical item.

Figure 1B:
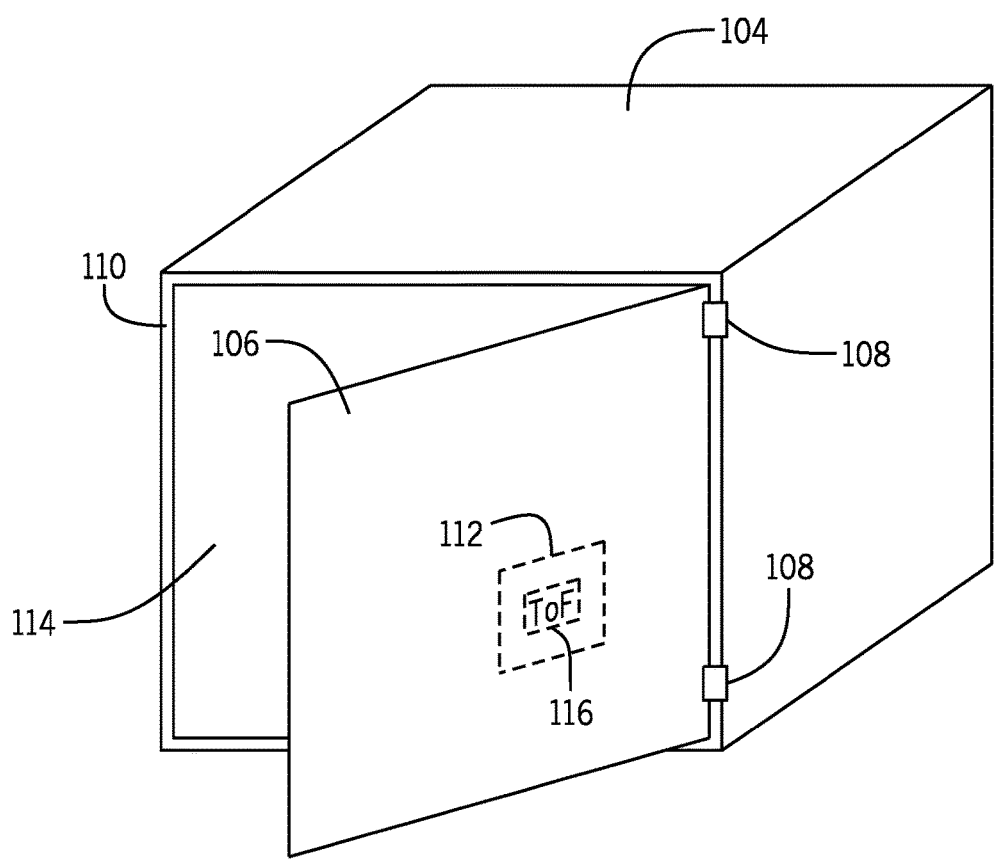

FIGS. 1A-1B illustrate an example truck 100 that includes a tractor unit 102 and a container 104 (provided on a chassis) hauled by the tractor unit 102. The container 104 is an example of a moveable platform that can be used to carry physical items. FIG. 1B is a perspective view of the container 104, to show that the container 104 has a door 106 (or other entry barrier) that is pivotable between an open position and a closed position.

In FIG. 1B, the door 106 is in the open position. The door 106 is pivotably mounted to hinges 108, which are attached to a door frame 110 of the container 104. The door 106 is able to rotate about the hinges 108 between the open position and the closed position. Although FIG. 1B shows two hinges 108, it is noted that in other examples, the door 106 can be mounted on just one hinge, or more than two hinges.

In some examples, a sensor device 112 is mounted to an interior surface of the door 106, such that when the door 106 is closed, the sensor 112 faces towards an inner chamber 114 of the container 104. As noted above, the container 104 is an example of a moveable platform. The inner chamber 114 of the container 104 (referred to as a "container chamber" in the ensuing discussion) is an example of an inner space of the moveable platform in which physical items can be carried. The container chamber 114 is defined by the walls of the container 104. In other examples, the sensor device 112 is not mounted on the door 106, but rather can be mounted on another surface inside the container 104.

In some implementations, in response to a door-closing event, the sensor device 112 can make a measurement for use in determining the load status of the container 104, i.e., to determine whether there is any physical item located within the container chamber 114 of the container 104. In some examples, the sensor device 112 includes a Time-of-Flight (ToF) sensor 116.

In FIG. 1A, it is assumed that physical items 118 are located within the container chamber 114. The ToF sensor 116 is able to emit a signal 113 that is reflected from a surface inside the container chamber 114. Based on the detection of the reflected signal by the ToF sensor 116, the sensor device 112 is able to determine a measurable feature that represents a distance between the ToF sensor 116 and the surface in the container chamber 114 that reflected the emitted signal 113

The measurable feature can be a distance between the ToF sensor 116 and a surface in the container chamber 114. In other examples, other measurable features can be determined, such as a phase difference between a transmitted periodic signal and a reflected periodic signal, a magnitude of the reflected signal, in-phase and quadrature-phase coefficients captured by an analog-to-digital (ADC) converter or other circuit in the ToF sensor 116, phase and magnitude coefficients relating to the in-phase and quadrature-phase coefficients, and so forth.

In examples where the ToF sensor 116 includes a light emitter, such as a light emitting diode (LED), a transmitted periodic signal can include multiple light pulses that employ an on-off-keying (OOK) of the light emitter. In other examples, other types of transmitted periodic signals can be employed.

Alternatively, the measurable feature can be a statistic based on multiple samples of the measurable feature, such as a mean, a variance, a covariance, a standard deviation, and/or a median of multiple samples of the measureable feature, or any combination of different types of measureable features. In further examples, other types of measurable features can be employed.

In the ensuing discussion, it is assumed that the measureable feature derived from measurement data of the ToF sensor 116 is a distance. However, techniques or mechanisms according to some implementations can be applied with other types of measurable features.

In the FIG. 1A example, the emitted signal 113 is reflected from a rear-facing surface 120 of the rear-most physical item 118. The rear-facing surface 120 faces the door 106 of the container 104. In examples where there are multiple physical items, the ToF sensor 116 measures the distance to the physical item 118 that is closest to the door 106. In the arrangement where the physical items 118 are present, the distance measure that is determined from the measurement of the ToF sensor 116 represents the distance between the sensor device 112 and the rear-facing surface 120 of the rear-most physical item 118.

If it is assumed that physical items 118 are loaded in the container chamber 114 from a front surface 122 of the container 104 towards the door 106 at the rear of the container 104, then the determined distance measure can provide a level of loading of the container 104, such as a percentage of loading or other measure of the amount of cargo loading inside the container chamber 114. For example, the distance measure having a first value can indicate a first non-zero amount of cargo loading in the container chamber 114, the distance measure having a second value can indicate a second non-zero amount of cargo loading in the container chamber, and so forth.

If the physical items 118 are not present in the container chamber 114, then the ToF sensor 116 makes a distance measurement to the front surface 122 of the container 104. In this case, the distance measure has another value that indicates that the container chamber 114 is empty.

The front surface 122 of the container 104 can be the front-most wall of the container 104. In other examples, another structure such as a frame can be located in the container chamber 114 against which physical items 118 can be placed. In such other examples, the front surface 122 is a surface of such other structure, or the floor of the container 104.

Although the present discussion refers to examples where the door 106 is located at the rear of the container 104 and physical items 118 are loaded from the front of the container chamber 114 to the rear of the container chamber 114, it is noted that in other examples, the door 106 can be located at a different part of the container 104, such as on a side wall of the container 104, or on a front wall of the container 104. In such other examples, the loading of physical items can be from side to side, or from the rear to the front. The sensor device 112 can also be located on a side wall or the front wall of the container 104 in such other examples.

In the foregoing discussion, it is assumed that the sensor device 112 is used to determine the load status of the entirety of the container chamber 114. In other examples, the container chamber 114 can be divided into multiple zones, and the sensor device 112 (or multiple sensor devices 112) can be used to determine the load status of each zone of these multiple zones. Thus, the sensor device(s) 112 can determine a load status of a first zone, a load status of a second zone, and so forth.

Figure 2:
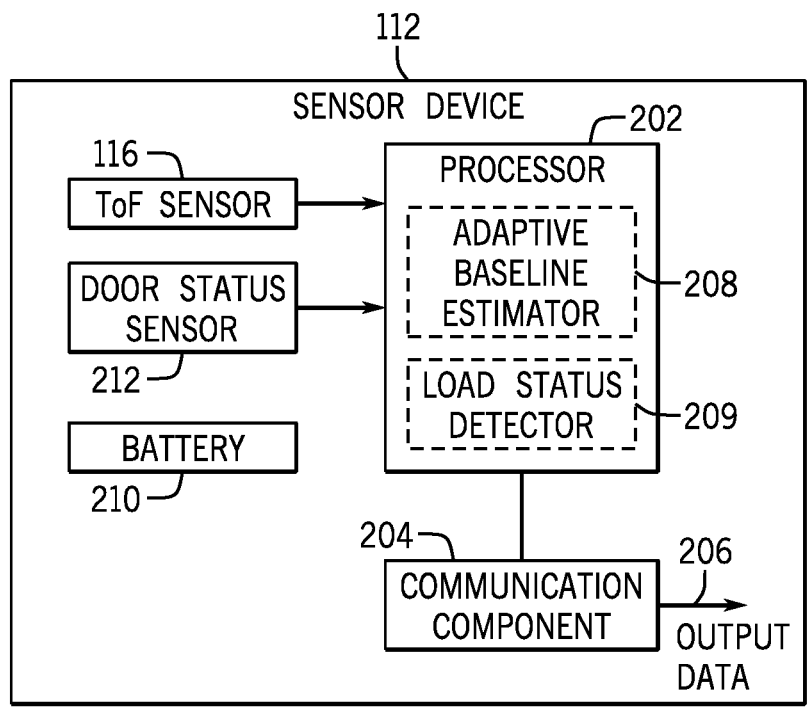
FIG. 2 is a block diagram of a sensor device according to some examples.

FIG. 2 is a block diagram of the sensor device 112 according to some examples. The sensor device 112 includes the ToF sensor 116, a processor (or multiple processors) 202, and a communication component 204. A processor can include a hardware processing circuit, such as a microprocessor, a core of a multi-core microprocessor, a microcontroller, a programmable gate array, a programmable integrated circuit device, or any other hardware processing circuit.

In some examples, the processor 202 receives measurement data from the ToF sensor 116, and based on the measurement data, the processor 202 is able to determine a load status of the container 104 (either the load status of the entirety of the container, or the load status of a zone of multiple zones in the container). The processor 202 provides the load status indication to the communication component 204, which transmits the load status indication 206 over a network to a destination, such as a remote service that is used to perform asset tracking.

The communication component 204 can include a wireless transceiver and associated circuits to allow for wireless communication of output data 206 by the sensor device 112 to the network. The wireless communication can include wireless communication over a cellular access network, a wireless local area network, a satellite network, and so forth. Alternatively, the communication component 204 can include a wired transceiver and associated circuits to perform wired communications between the sensor device 108 and the destination.

In other examples, the sensor device 112 does not perform the load status determination, but rather, the sensor device 112 transmits measurement data based on ToF data of the ToF sensor 116 using the communication component 204 to the destination. In such examples, the determination of the load status can be performed by a server (or servers) at the destination, based on the measurement data transmitted by the sensor device 112. In such examples, the processor 202 can simply transfer measurement data received from the ToF sensor 116 to the communication component 204 for transmission to the destination. Alternatively, the processor 202 can aggregate multiple measurement data samples from the ToF sensor 116, and can cause the aggregated measurement data to be transmitted to the destination. The aggregating of the multiple measurement data samples can include averaging the multiple measurement data samples, calculating a mean of the multiple measurement data samples, calculating a maximum or minimum of the multiple measurement data samples, or calculating some other statistic or measure based on the multiple measurement data samples.

In examples where the processor 202 of the sensor device 112 is configured to perform the load status determination, the processor 202 can execute an adaptive baseline estimator 208 and a load status detector 209. The adaptive baseline estimator 208 generates a baseline that is used by the load status detector 209 to determine, based on measurement data from the ToF sensor 116, the load status of the container 104. The baseline generated by the adaptive baseline estimator 208 can be a distance value or other measurable feature that corresponds to an empty status of the container 104. Such other measurable feature can include a phase difference measurement, a magnitude measurement, in-phase and quadrature-phase coefficients, phase and magnitude coefficients relating to the in-phase and quadrature-phase coefficients, and so forth. Alternatively, the baseline can be a statistic based on multiple samples of the measurable feature, such as a mean, a variance, a covariance, a standard deviation, and/or a median of multiple samples of the measureable feature that indicate an empty status. In further examples, a baseline can be a mixture of both a measureable feature and a statistic based on the measurable feature. In yet further examples, other types of baselines can be employed.

The baseline generated by the adaptive baseline estimator 208 can be iteratively refined to improve the accuracy of the load status determination by the load status detector 209. In examples where the baseline generated by the adaptive baseline estimator 208 is a distance baseline, an initial estimate of the baseline can be based on the known length of the container 104. The baseline can then be iteratively refined based on additional measurement data that indicates an empty status of the container 104.

The adaptive baseline estimator 208 and the load status detector 209 can be implemented in software such as machine-readable instructions executable on the processor 202. In other examples, the adaptive baseline estimator 208 and/or the load status detector 209 can be implemented using hardware.

In examples where the sensor device 112 does not perform the load status determination, the adaptive baseline estimator 208 and the load status detector 209 can be provided at a server (or multiple servers) that is (are) remote from the sensor device 112. Shifting the determination of the load status of a container to a remote server(s), instead of performing the load status determination at the sensor device 112, can reduce the complexity of the sensor device 112, and can allow the sensor device 112 to consume less power to save battery power in the sensor device 112.

The sensor device 112 further includes a battery 210 that provides power to the sensor device 112.

In some examples, to reduce power consumption of the sensor device 112, and thus to conserve the battery power, the sensor device 112 can be maintained in a sleep state until an event triggers the sensor device 112 to make a measurement and/or to perform processing tasks. A sleep state refers to a state of the sensor device 112 where the sensor device is powered off, or a portion of the sensor device 112 is powered off, such that the sensor device 112 consumes a lower amount of power than another state of the sensor device, such as an operational state. An operational state of the sensor device 112 is a state of the sensor device 112 where the sensor device is able to perform specified tasks, including measurement of data and/or processing of data. In the operational state, the sensor device 112 consumes more power than the power consumed by the sensor device in the sleep state.

In some examples, an event that can trigger the sensor device 112 to transition from the sleep state to the operational state can be a door close event, which is generated when the door is closed from an open position. The sensor device 112 can include a door status sensor 212 to detect either the opening or closing of the door 106 (FIG. 1) or other entry barrier. Although FIG. 2 shows the door status sensor 212 as being part of the sensor device 112, it is noted that in other examples, the door status sensor 212 can be external of the sensor device 112.

The door status sensor 212 can detect a change in status of the door 106 using any of various mechanisms. For example, a switch can be attached to the door, where the switch changes state in response to the door being opened or closed. As another example, a magnetic sensor can be used, where the magnetic sensor can be in proximity to a magnet when the door is closed, but when the door is opened, the magnetic sensor moves away from the magnet. The magnetic sensor can thus output different values depending upon whether the door is opened or closed. In other examples, acceleration data from an accelerometer and rotation data from a rotation sensor (such as a gyroscope or rotation vector sensor) can be used for detecting the door being opened and closed.

In response to the door status sensor 212 indicating that the door has been closed from an open position, the sensor device 112 can be awakened from the sleep state to the operational state. For example, the ToF sensor 116 can be activated from a lower power state to a higher power state, and/or the processor 202 can be activated from a lower power state to a higher power state. In some examples, in response to detecting that the door has been closed, the sensor device 112 can wait a specified time duration before transitioning from the sleep state to the operational state, such as to avoid triggering multiple transitions between the sleep state and the operational state in a short period of time, such as due to a person opening and closing the door in quick succession. Additionally, the processor 202 can wait to transition from the lower power state to the higher power state to allow the ToF sensor 116 time to power on and initialize and take measurements.

Figure 3:
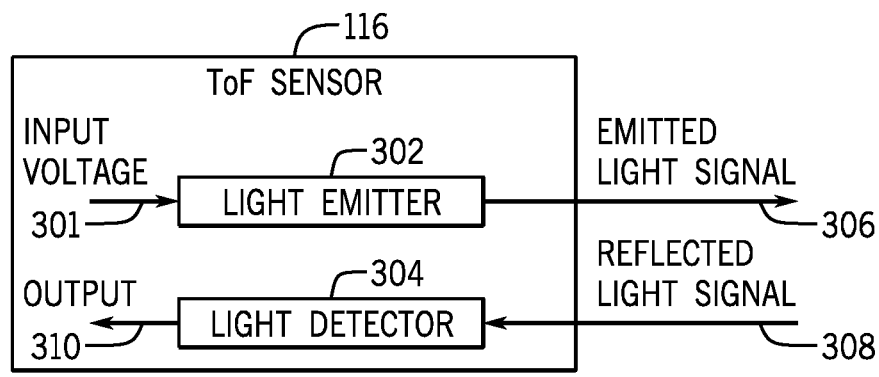
FIG. 3 is a block diagram of a time-of-flight sensor according to some examples.

FIG. 3 is a block diagram of an example ToF sensor 116, which includes a light emitter 302 and a light detector 304. Although just one light emitter 302 and one light detector 304 is shown in FIG. 3, the ToF sensor 116 in other examples can include multiple light emitters and/or multiple light detectors. The light emitter 302 can include a light emitting diode (LED) or another type of light source that can produce light either in the visible spectrum or invisible spectrum (e.g., infrared or ultraviolet light). The light detector 304 can include a photo-sensitive diode or other type of light detector.

The light emitter 302 can be used to transmit an emitted light signal 306, which can include one or more light pulses in some examples, into the container chamber 114. An input voltage 301 is applied to the light emitter 302 to cause the light emitter 302 to transmit the emitted light signal 306. The emitted light signal 306 is reflected as a reflected light signal 308 from a surface inside the container chamber 104, where the surface can be the rear-facing surface 120 of a physical item 118, or the front surface 122 of the container 104. The reflected light signal 308 is detected by the light detector 304, which produces an output 310 that is responsive to the reflected light signal 308. The output 310 can include an output voltage or an output current, which has a value (e.g. an amplitude) that is based on a property of the reflected light signal 308. Although not shown, the output 310 can be provided through a signal chain including intermediate circuits, such as an analog-to-digital (ADC) converter, an amplifier, a buffer, and so forth.

Figure 4:
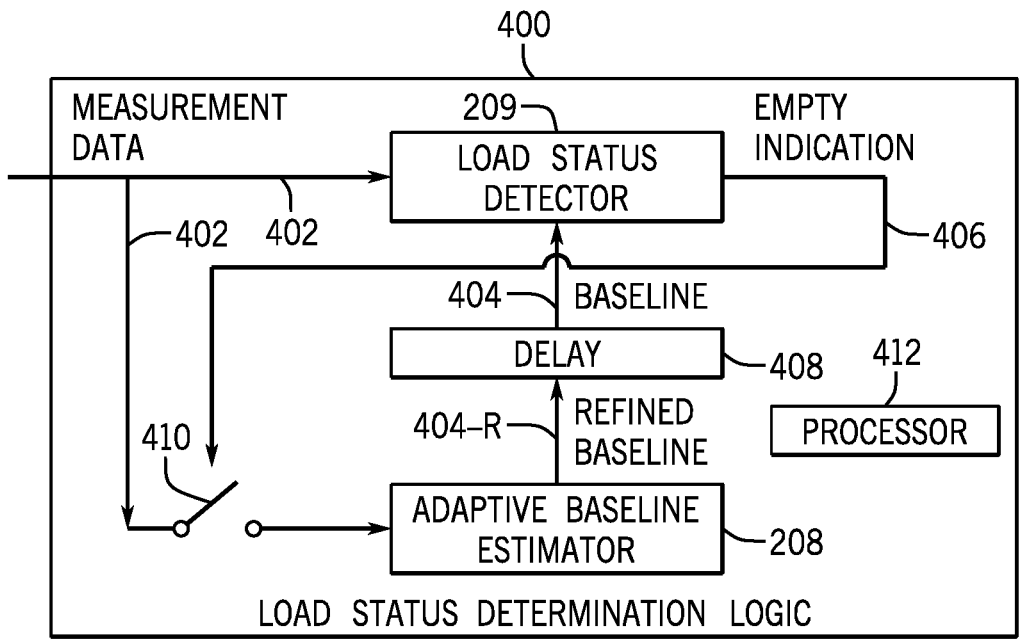
FIG. 4 is a block diagram of a load status determination logic according to some examples.

FIG. 4 shows an example load status determination logic 400 for determining a load status of the container 104. The load status determination logic 400 includes the load status detector 209 and the adaptive baseline estimator 208. In some examples, the load status determination logic 400 can be part of the sensor device 112, as shown in FIG. 2. In other examples, the load status determination logic 400 can be part of another electronic device (e.g., a server or servers) that is remote from the sensor device 112.

Measurement data 402 (e.g., a distance measure or other measureable feature as discussed above) based on measurement by the ToF sensor 116 is input into each of the load status detector 209 and the adaptive baseline estimator 208. In some instances, the measurement data 402 can indicate that the container 104 is empty, while in other instances, the measurement data 402 can indicate that the container 104 is loaded. Whenever the measurement data 402 indicates that the container 104 is empty, the adaptive baseline estimator 208 can be operated to update the baseline.

The measurement data 402 can be a single measurement data sample from the ToF sensor 116. Alternatively, the measurement data 402 can include multiple measurement data samples acquired at different times by the ToF sensor 116, or the measurement data 402 can be an aggregate of multiple measurement data samples. As noted above, the aggregating of the multiple measurement data samples can include averaging the multiple measurement data samples, calculating a mean of the multiple measurement data samples, calculating a maximum or minimum of the multiple measurement data samples, or calculating some other statistic or measure based on the multiple measurement data samples. By considering multiple measurement samples, effects due to noise in the measurement data can be reduced.

The adaptive baseline estimator 208 produces a refined baseline 404-R that is an updated version of a baseline based on new measurement data 402 that indicates an empty status. The ability to refine the baseline allows for a more accurate determination of the load status of the container 104 as characteristics of the container 104 and/or the sensor device 112 change over time, and/or as the environment conditions change.

The refined baseline 404-R can be an empty baseline that represents a condition indicating an empty status of the container. For example, the refined baseline 404-R can be a baseline distance or a different measurable feature as discussed above. A delay element 408 is provided between the output of the adaptive baseline estimator 208 and the input of the load status detector 209. The delay element 408 outputs a current baseline 404 (i.e., the baseline that was calculated in a previous iteration of the adaptive baseline estimator 208 prior to the calculation of the refined baseline 404-R). For example, the delay element 408 can be a buffer that stores the baseline 404. Since the adaptive baseline estimator 208 is able to update the refined baseline 404-R according to newly received measurement data 404 (which is the same measurement data considered by the load status detector 209), the delay element 408 is provided to avoid a race condition between the operation of the adaptive baseline estimator 208 and the load status detector 209.

The load status detector 209 receives the measurement data 402 and the baseline 404, and based on the measurement data 402 and the baseline 404, makes a determination of the load status of the container 104. The load status detector 209 then outputs a load status indication to provide an indication of the determined load status. In examples according to FIG. 4, the load status indication is in the form of an empty indication 406, which is set to an active value to indicate that the container 104 is empty, and an inactive value to indicate that the container 104 is loaded.

In some examples, the load status detector 209 can compare the measured distance expressed by the measurement data 402 to the baseline 404. More specifically, the load status detector 209 can compare the measured distance to a threshold that is derived based on the baseline 404. If the measured distance exceeds the threshold, then the load status detector 209 determines that the container 104 is empty. However, if the measured distance is less than the threshold, then the load status detector 209 determines that the container 104 is loaded with at least one physical item.

In some examples, the threshold can be a specified percentage of the baseline 404. For example, the threshold can be set at 99.5% of the baseline 404, or some other percentage of the baseline 404. In further examples, the threshold can be set equal to the baseline 404, or can be set to a value that is greater than the baseline 404. More generally, the threshold can be derived from the baseline 404 such that the threshold can be equal to the baseline 404 or can be a value that is different from the baseline 404.

As further shown in FIG. 4, the empty indication 406 is provided as an input to a switch 410. If the empty indication 406 is activated to the active state, then the switch 410 is closed to allow the adaptive baseline estimator 208 to receive the measurement data 402. The adaptive baseline estimator 208 can then compute the refined baseline 404-R based on the measurement data 402. However, if the empty indication 406 is maintained at the inactive state because the measurement data 402 indicates that the container 104 is not empty, then the switch 410 remains in the open position such that the adaptive baseline estimator 208 does not update the baseline.

More generally, the adaptive baseline estimator 208 is able to execute an adaptive decision process to make a decision, based on a current measurement data from at least one sensor (e.g., the ToF sensor 116), of a load status of a container. The process further performs feedback of the decision to refine the adaptive decision process to make a next decision regarding the load status of the container in response to receipt of further measurement data from the at least one sensor.

The load status indication (e.g., the empty indication 406) produced by the load status determination logic 400 can be output to other processing logic to perform further actions based on the load status indication. Such further actions can include storing the load status indication in a database (along with additional information, such as an identifier of the sensor device that transmitted measurement data, information relating to the container, e.g., dimensions, etc.), performing data analytics based on the load status indication as part of asset tracking, and so forth.

In some examples, the load status detector 209, the adaptive baseline estimator 208, the delay element 408, and the switch 410 can be implemented as software such as machine-readable instructions that are executable on a processor (or multiple processors) 412. The processor(s) 412 can be the processor(s) 202 in the sensor device 112 (FIG. 2), or can be processor(s) in a server (or multiple servers) remote from the sensor device 112.

Figure 5:
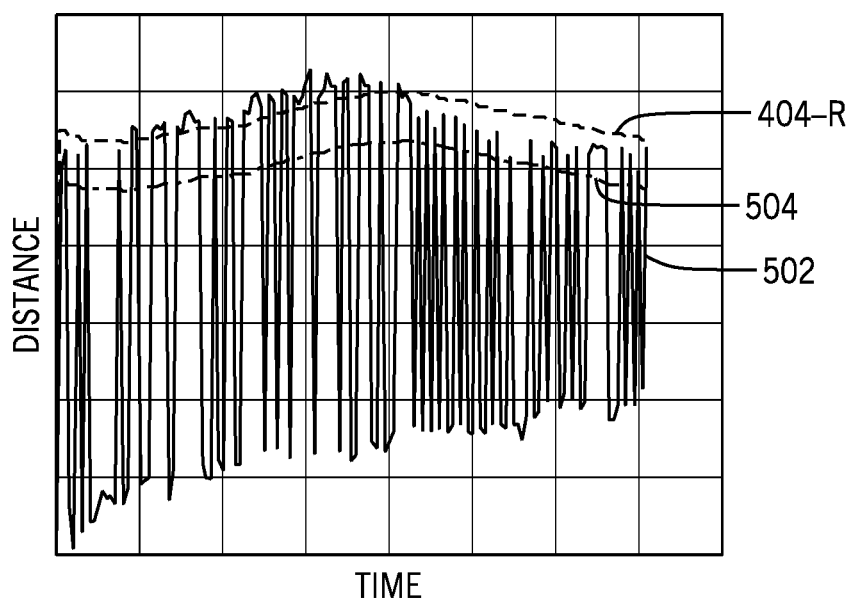
FIG. 5 is a graph of measurement data, a baseline, and a threshold, according to some examples.

FIG. 5 is a graph that illustrates an example of how the refined baseline 404-R is updated as measurement data based on measurements of the ToF sensor 116 is received over time (represented by the horizontal axis in the graph of FIG. 5). The measurement data is represented by a curve 502. For example, the measurement data can represent a distance. As can be seen in FIG. 5, the refined baseline 404-R varies with newly received measurement data.

FIG. 5 also shows a threshold 504, which is a specified percentage of the baseline. As can be seen in FIG. 5, the threshold 504 varies with the refined baseline 404-R.

Figure 6:
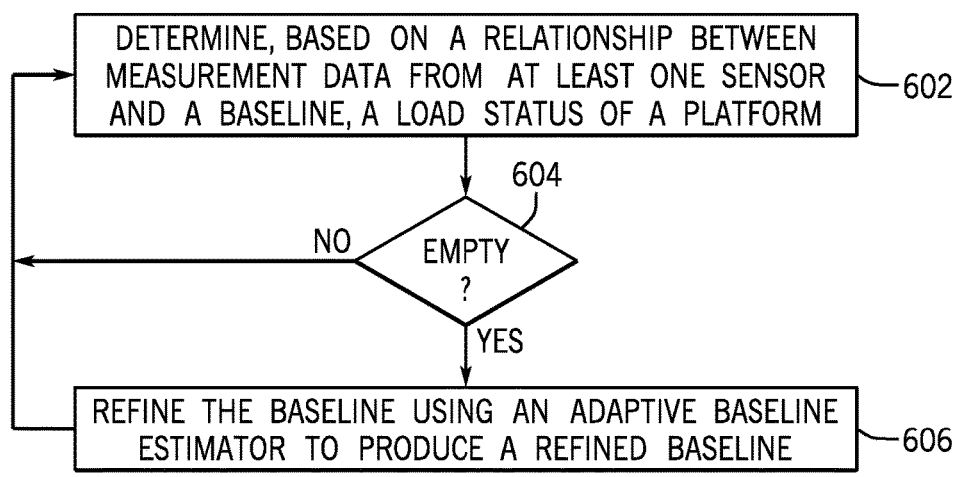
FIG. 6 is a flow diagram of a process according to some examples.

FIG. 6 is a flow diagram of a process that can be performed by at least one processor, such as the processor(s) 202 of FIG. 2. The at least one processor can be part of the sensor device 112, or alternatively, the at least one processor can be part of a server or other electronic device that is remote from the sensor device 112.

The process of FIG. 6 includes determining (at 602), based on a relationship between measurement data (e.g., 402 in FIG. 4) from at least one sensor (e.g., the ToF sensor 116) and a baseline (e.g., 404), a load status of a platform (e.g., the container 104 of FIGS. 1A-1B). For example, the process can determine whether a distance expressed by the measurement data exceeds a threshold derived from the baseline. If so, the determined load status is an empty status. If the distance does not exceed the threshold, then the determined load status is a loaded status.

The process checks (at 604) whether the determined load status is the empty status or the loaded status. If the loaded status, then the process returns to task 602. However, if the determined load status is the empty status, then the process refines (at 606) the baseline using the adaptive baseline estimator 208 to produce a refined baseline.

The process then returns to task 602 to determine, based on further measurement data (received from the ToF sensor 116 upon the next activation of the ToF sensor 116) and the refined baseline, a further load status of the container.

In some implementations of the present disclosure, the adaptive baseline estimator 208 includes a Kalman Filter, which can output a baseline as discussed above. The baseline can be iteratively updated to produce refined baselines.

The following are parameters of the Kalman Filter according to some examples.

| | | | |
|---|---|---|---|
| $x_p[n]$ | (State Prediction); | $\varepsilon[n]$ | (Prediction Error) |
| $P_p[n]$ | (Covariance Prediction); | $z[n]$ | (Observation) |
| $B[n]$ | (Control Input Model); | $R[n]$ | (Observation Covariance) |
| $F[n]$ | (State Transition Model); | $S[n]$ | (Innovation) |
| $H[n]$ | (Observation Model); | $K[n]$ | (Kalman Gain) |
| $w[n]$ | (Process Noise); | $\hat{x}_k[n]$ | (State Estimate) |
| $Q[n]$ | (Process Noise Model); | $\hat{P}_k[n]$ | (Error Covariance Estimate) |
| $v[n]$ | (Observation Noise); | $u[n]$ | (Control Input) |
| $x[n]$ | (True State) | | |

The parameter $z[n]$ represents measurement data (e.g., 402 in FIG. 4) from the ToF sensor 116 at time instant n. For example, $z[n]=(d[n]\ 0)'$, where $d[n]$ is the observed measurable distance feature determined from the ToF sensor 116 that corresponds to the actual distance $x[n]$ between the ToF sensor 116 and a surface within the container 104 (e.g., $d[n] \approx x[n]$).

The parameter $x[n]$ represents a true state of the baseline at time instant n (e.g., the actual distance that corresponds to an empty status of the container 104). The parameter $\hat{x}_k[n]$ represents the refined baseline (e.g., 404-R in FIG. 4) at time instant n based on current measurement data $z[n]$.

In some examples, the following parameters of the Kalman Filter do not change with time (n), and thus are set as follows:

$$F[n]=F, Q[n]=Q, H[n]=H, B[n]=0, w[n]=0; \text{ for } n=0,1,2,\ldots \quad \text{(Eq. 1)}$$

In Eq. 1, $F[n]$ represents a state transition model, $Q[n]$ represents a process noise model, $H[n]$ represents an observation model, $B[n]$ represents a control input model, and $w[n]$ represents noise.

In some implementations of the present disclosure, initial values of certain parameters of the Kalman Filter are based on the known characteristics of the container 104, such as the actual length of the container 104 that corresponds to the empty status. Thus, in some examples, the initial a posteriori Kalman estimates can include the following (note that in other examples, other initial estimates can be used):

$$\hat{P}_k[0] = \begin{pmatrix} \sigma_x^2[0] & 0 \\ 0 & \sigma_v^2[0] \end{pmatrix}, \hat{x}_k[0] = \begin{pmatrix} \mu_x[0] \\ \mu_v[0] \end{pmatrix}, \quad \text{(Eq. 2)}$$

where $\mu_x[0]$ is an initial baseline determined from the known characteristics of the container 104 (e.g., $\mu_x[0]$ can be set equal to the length of the container), $\mu_v[0]$ is an initial baseline feature (e.g., initial rate of change in $\mu_x[0]$ and may be set to zero or other initial value, $\mu_v[0]=0$), $\sigma_x^2[0]$ is the initial approximation of the variance of $\mu_x[0]$, and $\sigma_v^2[0]$ is the initial approximation to the variance of $\mu_v[0]$.

The state transition model F, observation model H, and process noise model Q model can be set as follows (in other examples, these models can be set to other values):

$$F = \begin{pmatrix} 1 & 1 \\ 0 & 1 \end{pmatrix}, H = (1\ 0), Q = \begin{pmatrix} \sigma_{w_1}^2[0] & 0 \\ 0 & \sigma_{w_2}^2[0] \end{pmatrix}, \quad \text{(Eq. 3)}$$

where $\sigma_{w_1}^2[0]$ is the initial approximation of the process noise variance for a first dimension, and $\sigma_{w_2}^2[0]$ is the initial approximation of the process noise variance for a second dimension. Also, in some examples, the observation covariance R[n] can be set as follows:

$$R[n]=\sigma_v^2[n]. \quad \text{(Eq. 4)}$$

In other examples, initial values of certain parameters of the Kalman Filter can be set as follows.

$$\hat{P}_k[0]=\sigma_x^2[0], \hat{x}_k[0]=\mu_x[0], \quad \text{(Eq. 5)}$$

where $\mu_x[0]$ and $\sigma_x^2[0]$ are the initial approximations expressed above. However, state transition model F, observation model H, and process noise model Q model can be set as follows:

$$F=1, H=1, Q=\sigma_{w_1}^2[0], \quad \text{(Eq. 6)}$$

At time instant n, the parameter z[n] representing the measurement data and the parameter x[n] representing the true state of the Kalman Filter are expressed as follows:

$$z[n]=H[n]x_k[n]+v[n],$$

$$x[n]=F[n]x[n-1]+B[n]u[n]+w[n]. \quad \text{(Eq. 7)}$$

Additionally, other parameters of the Kalman Filter are expressed as follows:

$$x_p[n]=F[n]\hat{x}_k[n-1]+B[n]u[n],$$

$$P_p[n]=F[n]\hat{P}_k[n-1](F[n])'+Q[n],$$

$$\varepsilon[n]=z[n]-H[n]\hat{x}_k[n-1],$$

$$S[n]=H[n]P_p[n](H[n])'+R[n],$$

$$K[n]=P_p[n](H[n])'(S[n])^{-1},$$

$$\hat{x}_k[n]=x_p[n]+K[n]\varepsilon[n],$$

$$\hat{P}_k[n]=(I-K[n]H[n])P_p[n]. \quad \text{(Eq. 8)}$$

For n=1, 2, 3, . . . , the Kalman Filter uses the measurement data z[n] at time instant n to refine the baseline, where the refined baseline is expressed as $\hat{x}_k[n]$.

$$x_p[n]=F\hat{x}_k[n-1],$$

$$P_p[n]=F\hat{P}_k[n-1]F'+Q,$$

$$\varepsilon[n]=z[n]-H\hat{x}_k[n-1],$$

$$S[n]=HP_p[n]H'+R[n],$$

$$K[n]=P_p[n]H'S^{-1},$$

$$\hat{x}_k[n]=x_p[n]+K[n]\varepsilon[n],$$

$$\hat{P}_k[n]=(I-K[n]H)P_p[n]. \quad \text{(Eq. 9)}$$

In other implementations, instead of using a Kalman Filter, the adaptive baseline estimator 208 can include a different type of filter. More generally, for example, the adaptive baseline estimator 208 can include a linear filter, a low pass filter, or a non-linear filter.

In some examples, a sanity check filter can be used to prevent or reduce the likelihood of refining the baseline based on extraneous measurement data. For example, the sanity check filter can be used to reset the baseline when the adaptive baseline estimator 208 drifts off due to the load status detector 209 missing cargo that is present in the container 104 and thus indicating falsely that the container 104 is empty, which can cause the adaptive baseline estimator 208 to incorporate corrupted feature measure(s) into the refined baseline.

In some implementations, the sanity check filter can compare a refined baseline against an upper threshold. If the refined baseline exceeds the upper threshold, then the sanity check filter can set the refined baseline to the upper threshold. Similarly, in some implementations, the sanity check filter can restrict the dynamic range of the refined baseline to a lower threshold (i.e., the refined baseline is not allowed to drop below the lower threshold). In yet further examples, the sanity check filter can revert the refined baseline to a previously calculated refined baseline in response to the refined baseline breaching either the upper or lower threshold (i.e., the refined baseline exceeds the upper threshold or the refined baseline being below the lower threshold). In other examples, the sanity check filter can replace the refined baseline with a predetermined baseline value (e.g., an initial baseline value). As another alternative, the sanity check filter can set the refined baseline to the predetermined baseline value after a predetermined number of ToF measurements. As further examples, the sanity check filter can set the refined baseline to the predetermined baseline value after a predetermined time period.

More generally, the sanity check filter determines whether the refined baseline has breached a threshold, and in response to such breach, the sanity check filter sets the refined baseline to a value different from that set by the adaptive baseline estimator 208.

In implementations where various components as discussed above are implemented as software such as machine-readable instructions, the machine-readable instructions can be stored in a non-transitory machine-readable or computer-readable storage medium. The storage medium can include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed or removable disks; or other types of storage devices. Note that the software or machine readable instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An apparatus comprising:
at least one processor configured to:
execute an adaptive decision process to make a decision, based on measurement data from at least one sensor, of a load status of a platform;
responsive to the load status, determined based on the measurement data from the at least one sensor, specifying that the platform is empty, perform a baseline update process that updates, based on the measurement data from the at least one sensor, an empty baseline representing an empty state of the platform;
responsive to the load status, determined based on the measurement data from the at least one sensor, specifying that the platform is not empty, decline to perform the baseline update process such that the empty baseline is not updated; and
determine, based on further measurement data from the at least one sensor, a further load status of the platform based on the empty baseline.

2. The apparatus of claim 1, comprising a sensor device that comprises the at least one sensor and the at least one processor.

3. The apparatus of claim 1, comprising a server, the server including a communication transceiver to receive the measurement data from the at least one sensor over a network.

4. The apparatus of claim 1, wherein the updating of the empty baseline is performed by a baseline estimator.

5. The apparatus of claim 4, wherein the baseline estimator comprises a Kalman Filter.

6. The apparatus of claim 1, further comprising a sensor to detect closing of an entry barrier to the platform, wherein the executing of the adaptive decision process is responsive to detecting of the closing of the entry barrier.

7. The apparatus of claim 1, wherein the measurement data is from a time-of-flight sensor.

8. A non-transitory machine-readable storage medium storing instructions that upon execution cause a system to:
determine, based on a relationship between measurement data from at least one sensor and a baseline, a load status of a platform, wherein the determining of the load status of the platform is responsive to a sensor detecting that an entry barrier of the platform has been closed;
responsive to the determining, refine the baseline using a baseline estimator to produce a refined baseline; and
determine, based on further measurement data and the refined baseline, a further load status of the platform.

9. The non-transitory machine-readable storage medium of claim 8, wherein the refining of the baseline to produce the refined baseline is performed in response to determining, based on the relationship between the measurement data from the at least one sensor and the baseline, that the load status specifies that the platform is empty, the refining of the baseline updating the baseline using the measurement data from the at least one sensor, and
wherein the instructions upon execution cause the system to, in response to determining, based on the relationship between the measurement data from the at least one sensor and the baseline, that the load status specifies that the platform is not empty, decline to refine the baseline using the baseline estimator.

10. The non-transitory machine-readable storage medium of claim 9, wherein the baseline estimator comprises a Kalman filter.

11. A method performed by at least one processor, comprising:
determining, based on a relationship between measurement data from at least one sensor and a baseline, a load status of a platform;
responsive to determining, based on the relationship between the measurement data from the at least one sensor and the baseline, that the load status specifies that the platform is empty, refining the baseline based on the measurement data from the at least one sensor using a baseline estimator to produce a refined baseline;
responsive to determining, based on the relationship between the measurement data from the at least one sensor and the baseline, that the load status specifies that the platform is not empty, decline to refine the baseline using the baseline estimator; and
determining, based on further measurement data and the refined baseline, a further load status of the platform.

12. The method of claim 11, further comprising:
responsive to the determining of the further load status, further refining the refined baseline using the baseline estimator to produce a further refined baseline for use in another determination of the load status of the container.

13. The method of claim 11, further comprising controlling a switch using an indication of the load status, wherein the switch is closed in response to the indication having a first value specifying that the platform is empty, and the switch is open in response to the indication having a second value specifying that the platform is not empty,
the switch when closed connecting the measurement data from the at least one sensor to the baseline estimator, and
the switch when open not connecting the measurement data from the at least one sensor to the baseline estimator.

14. The method of claim 11, further comprising:
detecting closing of an entry barrier of the platform based on a measurement from a sensor,
wherein the determining of the load status is performed in response to detecting the closing of the entry barrier of the platform.

15. The method of claim 11, wherein the at least one sensor comprises a time-of-flight sensor that detects a reflected signal inside the platform, the reflected signal responsive to an emitted signal in the platform, the reflected signal being from a surface of the platform when the platform is empty, and the reflected signal being from a surface of a physical item when the platform is loaded with the physical item.

16. The method of claim 11, wherein the baseline estimator comprises a Kalman filter.

17. The method of claim 11, wherein determining the load status of the platform is based on comparing the measurement data to a threshold that is derived from the baseline.

18. The method of claim 11, wherein the determining of the load status and the refining of the baseline are performed by the at least one processor of a sensor device that includes the at least one sensor, the method further comprising:

transmitting, by a communication transceiver of the sensor device, an indication of the load status to a remote server.

19. The method of claim 11, wherein the determining of the load status and the refining of the baseline are performed by the at least one processor that is in a server, the method further comprising:

receiving, over a network from a sensor device that includes the at least one sensor, the measurement data.

20. The method of claim 11, further comprising:

determining whether the refined baseline has breached a threshold; and in response to determining that the refined baseline has breached the threshold, setting the refined baseline to a value different from that set by the baseline estimator.

\* \* \* \* \*